Nov. 21, 1967    H. WEINBERGER    3,353,207
SHRIMP SHELLER AND DEVEINER
Filed Sept. 14, 1965
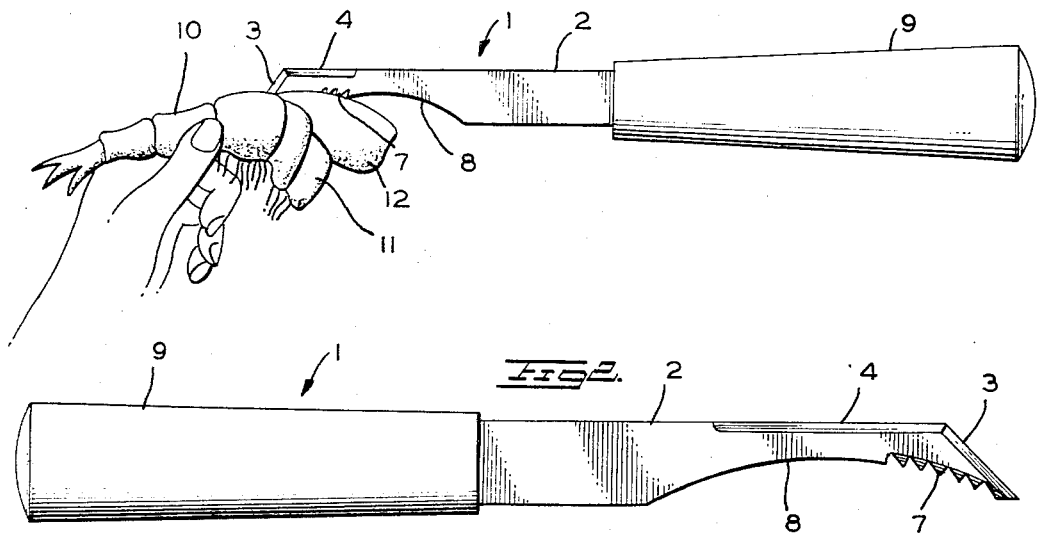
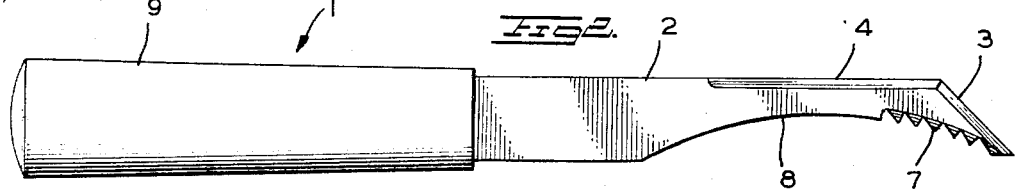
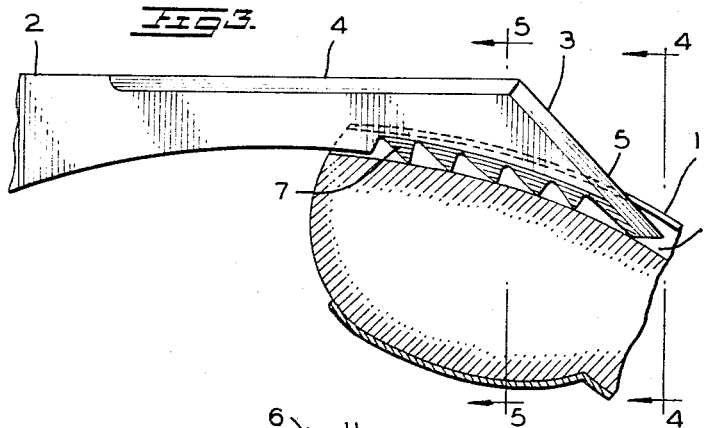
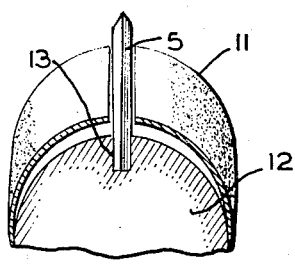
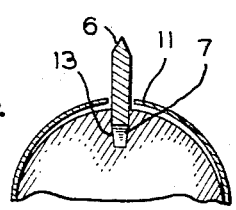
INVENTOR
HAROLD WEINBERGER
BY *Frank Plyr*
ATTORNEY The object of the instant invention is a knife having a handle and a blade secured thereto. This blade is specifically shaped to be adequately adaptable to the cutting of a shrimp shell and, at the same time, the sand vein thereof. For this twin purpose the front end of the blade is provided with cutting edges forming an obtuse angle therebetween, while the under edge of the knife has an arcuate front portion of such an extent as to accommodate the natural curvature of the shrimp, this arcuate portion terminating at the front end of the blade with teeth, in such manner as to afford by means of this knife a cutting of the shrimp shell due to the cutting edges, and at the same time cutting and removing of the sand vein due to the teeth.

United States Patent Office 3,353,207
Patented Nov. 21, 1967

3,353,207
SHRIMP SHELLER AND DEVEINER
Harold Weinberger, 31 S. Stanley Road,
South Orange, N.J. 07052
Filed Sept. 14, 1965, Ser. No. 487,144
3 Claims. (Cl. 17—7)

This invention relates to a shrimp sheller and deveiner, herein for convenience called a shrimp cleaner, which is particularly adapted for use on raw or uncooked and cooked shrimp.

The object of the instant invention is a knife having a handle and a blade secured thereto. This blade is specifically shaped to be adequately adaptable to the cutting of a shrimp shell and, at the same time, the sand vein thereof. For this twin purpose the front end of the blade is provided with cutting edges forming an obtuse angle therebetween, while the under edge of the knife has an arcuate front portion of such an extent as to accommodate the natural curvature of the shrimp, this arcuate portion terminating at the front end of the blade with teeth, in such manner as to afford by means of this knife a cutting of the shrimp shell due to the cutting edges, and at the same time cutting and removing of the sand vein due to the teeth.

As is well known, most of the shrimp which is offered for sale to the consumer has previously been beheaded and is offered for sale either in a frozen or fresh condition with the shell of the shrimp still remaining thereon. It then becomes necessary for the purchaser of the shrimp to remove the shell prior to consumption thereof and the removal of the shell is a task which can be quite time consuming as well as one which may not be performed under the most sanitary conditions. It is, therefore, the main object of the present invention to provide a hand tool which may be efficiently employed for removing the shell and the sand vein of a shrimp, whether the shrimp be in a raw or uncooked state.

A further object of the invention is to provide a hand operated tool which may be efficiently employed by the user thereof for simultaneously slitting or cutting the shell of a shrimp, whether the shrimp be cooked or uncooked and to remove the sand vein which extends along the back of the shrimp.

It is a still further object of the invention to provide a hand operated tool which will insure the complete cutting off of the shell of a shrimp and simultaneously removing the sand vein in the one operation.

A still further object of the invention is to provide a hand operated cutting implement which will insure the cutting of the shell of a shrimp and to provide such hand operated cutter with teeth which will simultaneously clean out the sand vein of the shrimp while the cutter portion of the hand operated tool slits the shell.

Among the further objects and advantages of my invention is the fact that my device is simple in form, efficient in operation, easy to manufacture, relatively inexpensive, durable and may be operated by an unskilled person in the cleaning of shrimp whether the shrimp be in its raw or cooked state.

These objects and advantages as well as other objects and advantages may be achieved by the device illustrated in the drawing in which:

FIG. 1 is a side view of my shrimp sheller and deveiner showing the same as it is employed by a user thereof in slitting the shell of the shrimp and simultaneously deveining the same;

FIG. 2 is an enlarged side view of the shrimp sheller and deveiner shown in FIG. 1;

FIG. 3 is an enlarged fragmentary side view of the cutter portion and teeth for deveining the shrimp;

FIG. 4 is a view taken on line 4—4 of FIG. 3; and

FIG. 5 is a view taken on line 5—5 of FIG. 3.

Referring to the drawings in greater detail, the shrimp sheller and deveiner is designated generally by the reference character 1 and for convenience, the combined shrimp sheller and deveiner will hereinafter be referred to as a shrimp cleaner.

Reference character 2 designates a blade-like body member which can be made of any suitable material, preferably stainless steel, and terminates at the forward portion thereof into a configuration defining an obtuse angle. The obtuse angle, aforesaid, comprises cutting portions 3 and 4. Cutter portions 3 and 4 are formed at the upper portion of the blade-like body 2 and are made of any suitable material, preferably stainless steel and it is pointed out that the cutter portion 3 terminates in a sharp cutting edge designated by reference character 5. Likewise, the trailing edge 4 of the obtuse angle, aforesaid, has formed at the upper surface thereof, a sharpened edge 6. It will be understood that while the blade-like body member 2 is stated as preferably being made of stainless steel and the cutter portions 3 and 4 are also made preferably of stainless steel, the cutter portions 3 and 4 can be made out of any suitable material provided the material can be sharpened to a sharp edge.

Positioned at the forward end of the shrimp cleaner and extending below the cutter members 3 and 4, aforesaid, are a plurality of teeth-like members 7. The teeth 7 extend from the forward end of the shrimp cleaner to a distance rearwardly of the cutter member 3 and as will be evident from the disclosure in FIGS. 2 and 3 of the drawings, the teeth are arranged in a curved manner and incline forwardly and the blade member 2 has formed along the undersurface thereof a curvature designated by reference character 8 which corresponds to the natural curvature of a shrimp which has been beheaded and the curvature thereof follows along the lines of curvature of the teeth formation.

A handle 9 is connected in any manner to the blade 2 at the rear portion thereof and the handle 9 may be made of plastic, wood or any other suitable material, suffice it to say that the handle 9 and the blade 2 are permanently secured to one another.

Numeral 10 designates a shrimp which has been beheaded and which still has the shell 11 thereon.

Reference character 12 designates the meat portion of the shrimp and the sand vein is designated by reference character 13.

It should be pointed out at this time that, unlike prior devices employed for accomplishing the shelling and deveining of a shrimp, the present invention provides for a hand operable device which will insure the complete cutting off of the shell of the shrimp and simultaneously deveining the same in one operation.

As will be observed from FIGS. 1, 3, 4 and 5, the sharpened edge 5 of cutter member 3 first engages the shell 11 of the shrimp and due to its sharpened edge, it slits the same as the hand operated tool is pushed along the body of the shrimp to be cleaned. It will be observed that the shell is completely cut away from the shrimp body thereby making available with ease the meat portion of the shrimp. The sharpened edge 5 of cutter member 3 will under normal circumstances cut away the shell of the shrimp as the hand tool is operated for deshelling the shrimp but should the sharpened edge 5 of cutter member 3 not accomplish the cutting for one reason or another, then the sharpened edge 6 which is formed along cutter member 4 will engage the undersurface of the shell of the shrimp and the sharpened edge thereof cut the shell of the shrimp. As will be observed from FIGS. 3, 4 and 5 of the drawings, with the simultaneous cutting of the shell of the shrimp, the teeth 7 engage the vein of the shrimp and as the hand tool is pushed along the back portion of the shrimp, the vein will be cleaned while the shell is being cut.

As will readily be observed from FIG. 1 of the drawings, the user of the shrimp cleaner of the present invention holds the shrimp to be cleaned in one hand and then by simply pushing the implement forward with the other hand, the shell of the shrimp is effectively cut and simultaneously therewith, the vein which extends along the back of the shrimp is simultaneously cleaned of any matter contained therein.

Thus, it will be seen that I have provided a simple hand operated tool which will enable one to use the same efficiently in cutting away the shell of a shrimp and simultaneously cleaning out the vein extending along the back of the shrimp in one simple hand operation. Also, it will be apparent that I have herein provided a tool which can be easily kept in a sanitary condition since all of the parts which are exposed to the shrimp during the cutting and cleaning operation can be effectively cleaned, with no moving parts in the hand tool to entrap any of the shell of the shrimp or meat, thereby rendering the cleaning of the tool most simple.

While I have described the preferred embodiment of the invention and illustrated the same in the accompanying drawings, certain minor changes or alterations may appear to one skilled in the art to which this invention relates during the extensive manufacture of the same and I, therefore, reserve the right to make such changes or alterations as shall fairly fall within the scope of the appended claims.

What I claim is:

1. A shrimp cleaner comprising a body having a handle at the rear and a cutter portion at the front, said cutter portion comprising a first cutter portion and a second cutter portion, said cutter portions defining an obtuse angle, sharpened edges extending along said cutter portions, teeth formations extending along the undersurface of said obtuse angle formation and a concave curvature extending rearwardly of said teeth formation, said curvature being co-extensive with and conforming to the natural curvature of the shrimp, to allow penetration of the teeth formation in the sand vein of the shrimp while the aforesaid sharpened edges cut the outer shell of the shrimp.

2. A shrimp cleaner as defined in claim 1 wherein the teeth formation inclines forwardly of said curvature.

3. A shrimp cleaner as defined in claim 1, wherein the teeth formations follow along the aforesaid curve.

References Cited

UNITED STATES PATENTS

| | | | |
|---|---|---|---|
| 700,617 | 5/1902 | Cobaugh | 17—7 X |
| 1,935,149 | 11/1933 | Elvin | 17—7 |
| 2,611,181 | 9/1952 | Coulter | 17—7 X |

LUCIE H. LAUDENSLAGER, *Primary Examiner.*